(12) United States Patent
Golds

(10) Patent No.: US 6,850,959 B1
(45) Date of Patent: Feb. 1, 2005

(54) METHOD AND SYSTEM FOR TRANSPARENTLY EXTENDING NON-VOLATILE STORAGE

(75) Inventor: David P. Golds, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 150 days.

(21) Appl. No.: 09/697,265

(22) Filed: Oct. 26, 2000

(51) Int. Cl.[7] .............................................. G06F 17/30
(52) U.S. Cl. ....................... 707/205; 707/200; 707/204
(58) Field of Search ......................... 711/1–5; 707/200, 707/204, 205, 1, 10, 202; 709/220

(56) References Cited

U.S. PATENT DOCUMENTS

| | | | |
|---|---|---|---|
| 5,410,667 A | | 4/1995 | Belsan et al. |
| 5,689,701 A | * | 11/1997 | Ault et al. ..................... 707/10 |
| 5,706,510 A | | 1/1998 | Burgoon |
| 5,778,384 A | | 7/1998 | Provino et al. |
| 5,890,214 A | * | 3/1999 | Espy et al. .................. 711/114 |
| 5,907,673 A | | 5/1999 | Hirayama et al. |
| 5,907,679 A | * | 5/1999 | Hoang et al. ............... 709/220 |
| 5,913,037 A | * | 6/1999 | Spofford et al. ............ 709/226 |
| 5,918,229 A | | 6/1999 | Davis et al. |
| 5,937,406 A | * | 8/1999 | Balabine et al. ............ 707/100 |
| 5,983,012 A | * | 11/1999 | Bianchi et al. ............... 703/23 |
| 6,006,029 A | * | 12/1999 | Bianchi et al. ............... 703/24 |
| 6,012,130 A | * | 1/2000 | Beyda et al. ............... 711/173 |
| 6,061,695 A | * | 5/2000 | Slivka et al. ............... 715/513 |
| 6,119,131 A | * | 9/2000 | Cabrera et al. ............. 707/203 |
| 6,128,734 A | * | 10/2000 | Gross et al. ................ 713/100 |
| 6,185,574 B1 | | 2/2001 | Howard et al. |
| 6,189,000 B1 | * | 2/2001 | Gwertzman et al. ........... 707/1 |
| 6,356,915 B1 | * | 3/2002 | Chtchetkine et al. ....... 707/200 |
| 6,363,400 B1 | * | 3/2002 | Chtchetkine et al. ....... 707/200 |
| 6,421,684 B1 | * | 7/2002 | Cabrera et al. ............. 707/200 |
| 6,442,548 B1 | * | 8/2002 | Balabine et al. .............. 707/10 |
| 6,453,383 B1 | * | 9/2002 | Stoddard et al. ............ 711/112 |

FOREIGN PATENT DOCUMENTS

| | | |
|---|---|---|
| EP | 0 774 715 A1 | 5/1997 |
| WO | WO 99/09480 | 2/1999 |
| WO | WO 99/12098 | 3/1999 |
| WO | WO 99/21082 | 4/1999 |

OTHER PUBLICATIONS

LaLonde, Ken, "Batch daemon—README", UNIX Batch Command, University of Toronto, pp. 1–3 (Feb. 27, 1997), ftp://ftp.cs.toronto.edu/pub/batch/tar.z printed Dec. 8, 2000.

Steere et al., "A Feedback–driven Proportion Allocator for Real–Rate Scheduling", *Third Symposium on Operating Systems Design and Implementation (OSDI '99)*, USENIX Association, pp. 145–158 (1999).

\* cited by examiner

Primary Examiner—Jean M. Corrielus
(74) Attorney, Agent, or Firm—Law Offices of Albert S. Michalik, PLLC

(57) ABSTRACT

Briefly, the present invention provides a system and method for transparently extending the non-volatile storage on a computer system via links from one drive to one or more other drives. When the user adds a new disk drive, it is formatted but not mounted where the user can see it. The data of selected files is automatically migrated from the original drive to the new, supplemental drive, or directly created thereon, and a link is placed on the original volume to indicate to the system that the data is really elsewhere. In one implementation, this is accomplished via an NTFS reparse point on an NTFS link that is made a sparse file, thereby reclaiming the disk space on the original drive. A driver in the NTFS filter stack or the like in conjunction with the file system handles directing reads and writes to the new location, and also handles other operations including totaling the free space of each drive in response to a free space request. The driver may also enforce file operation rules, that may depend on whether the supplemental drive and/or supplemental file system is present or removed, and so forth. In this manner, the size of the original drive increases from a user's perspective, while providing a unified view of namespace, with file names present even when the supplemental drive is removed.

19 Claims, 7 Drawing Sheets

METHOD AND SYSTEM FOR TRANSPARENTLY EXTENDING NON-VOLATILE STORAGE

TECHNICAL FIELD

The invention relates generally to computer systems and non-volatile data storage, especially hard disk drives.

BACKGROUND OF THE INVENTION

When a user purchases a new disk drive for upgrading an existing system, such a disk drive is often much larger (as well as possibly faster) than the existing hard drive. One option that the user has is to replace the original drive with the new drive, after saving the data from the old drive and copying it to the new drive in some way. This is not particularly desirable, because the initial save and copy operation is required, and the original drive is then not used.

Another option that a user has is to add the new drive to the existing system (e.g., with existing drive C:\) under a new drive letter, (e.g., D:\). This is also not particularly desirable to many users that do not want multiple hard drive volumes, each with its own namespace, own free space, and so forth. A similar situation exists on operating systems (such a Unix systems) that mount volumes at directory such as /user/volume2. Although it is feasible for a file system volume to span multiple spindles using established volume manager techniques such as striping, spanning or concatenation, these techniques have a number of constraints for end users, including that they often require changes to the BIOS/kernel/volume manager to support proper booting, and the entire file system fails when any one disk fails or is removed. As can be appreciated, this solution is impractical with removable drives, which are becoming commonplace, since the disk set created via striping, spanning or concatenation cannot tolerate the removal of one of its elements, whereby the removable disk is effectively no longer removable.

In short, known techniques for increasing the amount of non-volatile storage on a computer system suffer from the above-identified problems and other drawbacks.

SUMMARY OF THE INVENTION

Briefly, the present invention provides a system and method for transparently extending the non-volatile storage on a computer system in a manner that solves the above-described problems through the use of automatically-created links from one file system to one or more other file systems. More particularly, when the user adds a new disk drive, it is formatted but not mounted in a namespace where the user can see it via normal user interfaces. Instead, in accordance with an appropriate policy, an agent of the operating system automatically migrates selected file data from the original drive to the new drive and space reclaimed from the original drive in a manner that is transparent to the user. To this end, policy-selected existing files are copied to the file system on the new hard drive, and a bi-directional link is associated with the original file to indicate that the data is really elsewhere. In one implementation, this is accomplished via an NTFS reparse point. The file data on the original drive is then removed (e.g., the file is made sparse), thereby reclaiming the disk space on the original drive. For new files, this may be done directly, without copying, e.g., a sparse file is created on the original drive, with an NTFS reparse point on the file indicating that the data is really on the other drive.

The new location of the file data is then stored in the original file's Reparse Data, thus recording the target of this link association. In addition, information about the source of the link may also be stored with the target of the link so that the link is bi-directional. This has a number of advantages, for example, it means that the original location of files may be recovered even if the original drive fails or is unavailable.

In this manner, the original drive simply appears to grow to the user. A driver in the NTFS filter stack or the like handles direct reads and writes to the new location, and also handles other operations like totaling the free space of each drive in response to a free space request to provide a unified view of free space on the various volumes. The driver may also enforce file operation rules, that may depend on whether the supplemental drive and/or supplemental file system is present or removed, and so forth.

A unified view of namespace is hence provided. Moreover, because the links are maintained in the original drive, the namespace remains unchanged even if the other drive is removed. For example, a user will see the full volume directory even if the new drive is removed; the user can be instructed to reconnect the new drive in order to access data from a removed drive.

Other advantages will become apparent from the following detailed description when taken in conjunction with the drawings, in which:

DETAILED DESCRIPTION OF THE INVENTION

Exemplary Operating Environment

Figure 1:
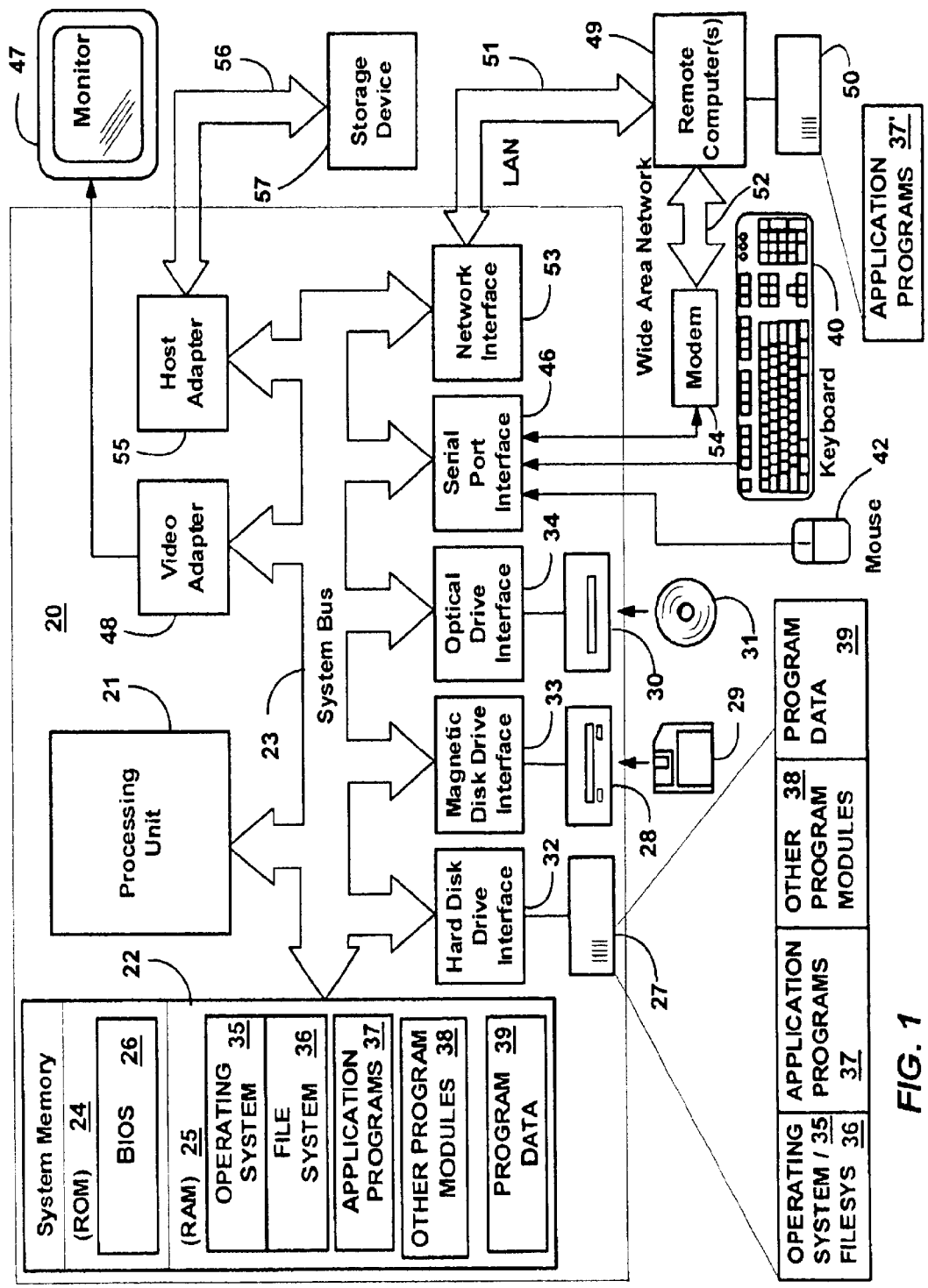
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000). The computer 20 includes a file system 36 associated with or included within the operating system 35, such as the Windows® NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is described herein with reference to Microsoft Corporation's Windows® 2000 (formerly Windows NT®) operating system, and in particular to the Windows NT® file system (NTFS). Notwithstanding, there is no intention to limit the present invention to Windows® 2000, Windows NT® or NTFS, but on the contrary, the present invention is intended to operate with and provide benefits with any operating system, architecture and/or file system that needs to store data.

Transparently Extending Non-Volatile Storage

Figure 2:
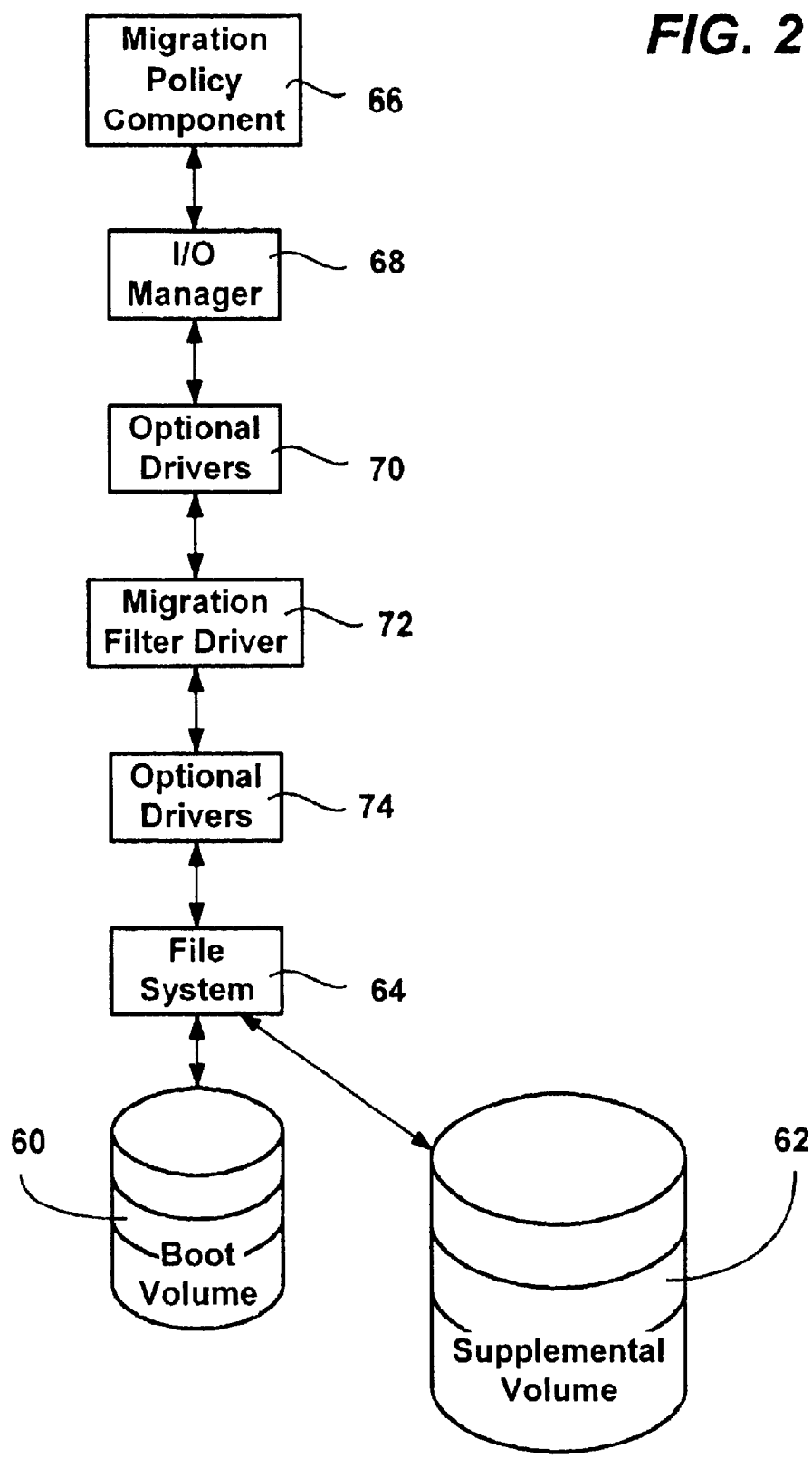
FIG. 2 is block diagram representing various components for performing file operations on migrated files in accordance with an aspect of the present invention.

Turning now to FIG. 2 of the drawings, there is shown the general concept of the present invention, wherein a boot file system volume 60 has a supplemental file system volume 62 associated therewith. In general, the user can add one or more such drives, which may be detected by plug-and-play technology. Then, for example, the first time the user installs such a drive, the user may be given an option to add the drive as a new, conventional drive, or as an extended (supplemental) drive. The present invention is directed to the supplemental drives, which will thus be described hereinafter. Once chosen as supplemental, the drive is formatted, but not mounted. If the drive is removable, information can be stored thereon that informs the computer system that the drive is a supplemental drive whenever it is connected. For purposes of simplicity herein, a single supplemental drive comprising a single supplemental volume will be described, however as will be understood, more than one supplemental drive may be used with the present invention, and each supplemental drive may have more than one volume formatted thereon, including both conventional volumes and/or volumes supplemental to other volumes.

In accordance with one aspect of the present invention, after the initial formatting, the supplemental file system volume 62 is not mounted in a conventional way by a file system, e.g., the user does not see a separate drive letter, however a file system 64 (e.g., NTFS) of the boot file system volume 60 can perform file system operations to the supplemental file system volume 62. Such operations include creating, reading, writing, deleting, setting attributes on file system objects (files and directories) and so forth. For purposes of simplicity hereinafter, the file system objects will be referred to as files, although it is understood that directories may be similarly handled (e.g., created, renamed, deleted, and so forth).

In accordance with another aspect of the present invention, files may be selectively migrated from the boot volume 60 to the supplemental volume 62. To this end, a migration policy component 66 selects files for migration, and sends I/O requests through an I/O manager 68 or the like to request the migration. Note that hierarchical storage management (HSM) technology or the like may implement such policies. Alternatively, the files may be migrated when created, rather than later, and also (unlike HSM) updated directly, i.e., while they reside on the target media, as described below. Note that this also differs from symbolic link technology, in that migrated links are bi-directional and created dynamically.

In the Windows® 2000 architecture described herein, the I/O manager 68 issues file system I/O (input/output) request packets (IRPs) corresponding to the file system requests through a stack of filter drivers (e.g., filter drivers 70, 72 and 74) to the file system 64. In this environment, filter drivers are independent, loadable drivers through which IRPs are passed. Each IRP corresponds to a request to perform a specific file system operation, such as read, write, open, close or delete, along with information related to that request, e.g., identifying the file data to read. A filter driver may perform actions to an IRP as it passes therethrough, including modifying the IRP's data, aborting its completion and/or changing its returned completion status. Other filter drivers (not shown) may be present.

One of the filter drivers includes a migration filter driver 72 that handles certain operations directed to migrated files, as described below. In general, the migration filter driver 72 receives IRPs sent to and from the file system, and these IRPs can be intercepted and or modified as desired to take actions to enable the use of the supplemental file system volume 62 for data storage operations. It can be readily appreciated, however, that the filter driver stack model is not necessary to the present invention, as, for example, the logic and other functionality provided thereby can be built into the file system.

Figure 3:
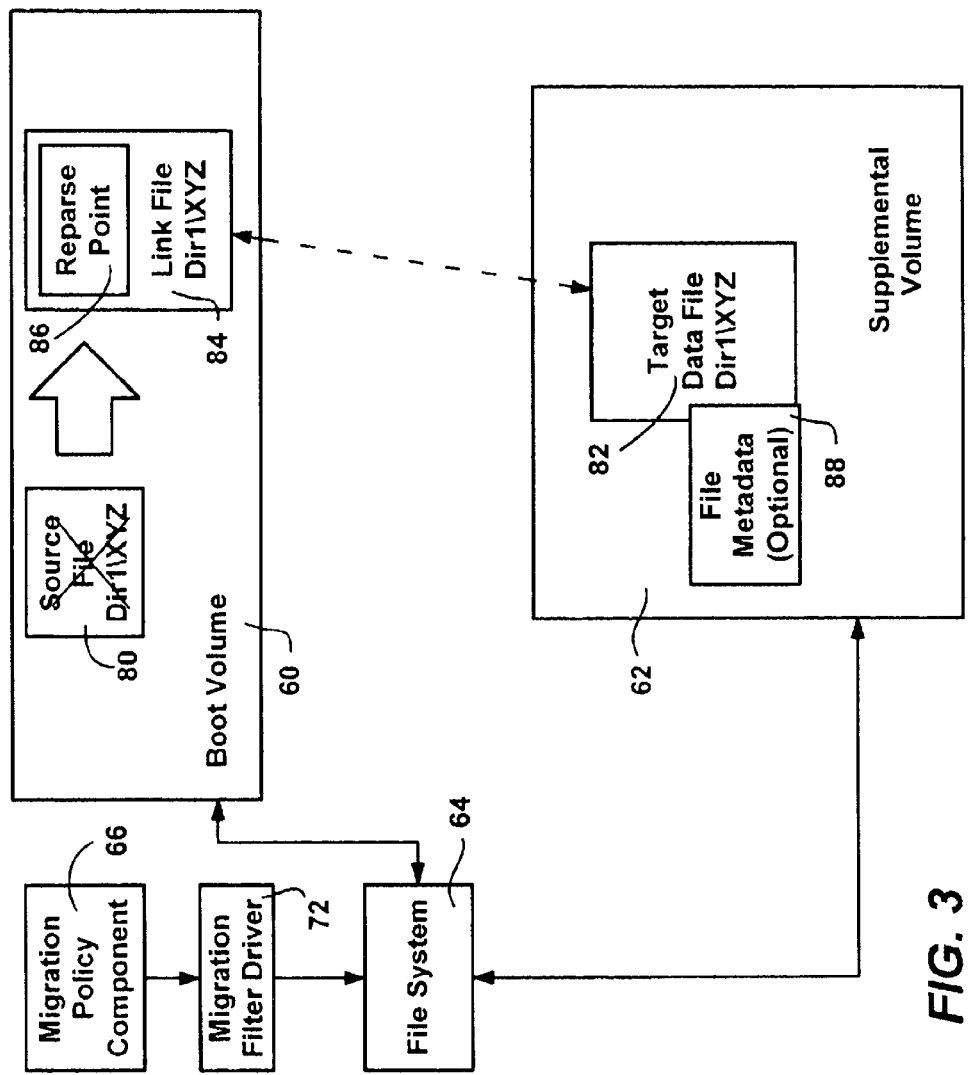
FIG. 3 is a block diagram representing the migrating of a source file to a link file on the boot drive and migrated data file on a supplemental drive in accordance with an aspect of the present invention.

FIG. 3 demonstrates one general concept underlying file migration, wherein a facility such as the migration policy component 66 may explicitly request that a source file 80 be migrated to a target file 82 on the supplemental volume 62. As generally represented in FIG. 3, the migration request normally results in the data of the source file 80 being copied to the supplemental drive volume, and the source file 80 converted to a link file 84, including associating a reparse point 86 (described below) with the link file 84 to indicate its data is elsewhere. The link file 84 may be made sparse, thereby reclaiming its disk space. The migration policy may be set by default and/or by an administrator or user (e.g., migrate files of a certain type such as graphics, those over some threshold size, and/or those not used within some period of time, and so forth). Note that certain system files needing for booting the computer system are already protected against being moved or otherwise altered in contemporary computer systems, to ensure that the computer system can boot without the supplemental drive connected.

Although not necessary to the present invention, for safety, the migrated data file 82 on the supplemental disk may include or otherwise be associated with some or all of its metadata 88 (e.g., filename) so that if the original volume is inoperable, the data may be easily found and recovered.

In keeping with the invention, each link file (e.g., 84) need not include the original file data, thereby reclaiming disk space. More particularly, in one implementation, the link files are NTFS sparse files, which are files that generally appear to be normal files but do not have the entire amount of physical disk space allocated therefor, and may be extended without reserving disk space to handle the extension. Reads to unallocated regions of sparse files return zeros, while writes cause physical space to be allocated. Regions may be deallocated using an I/O control call, subject to granularity restrictions. Another I/O control call returns a description of the allocated and unallocated regions of the file.

Figure 4:
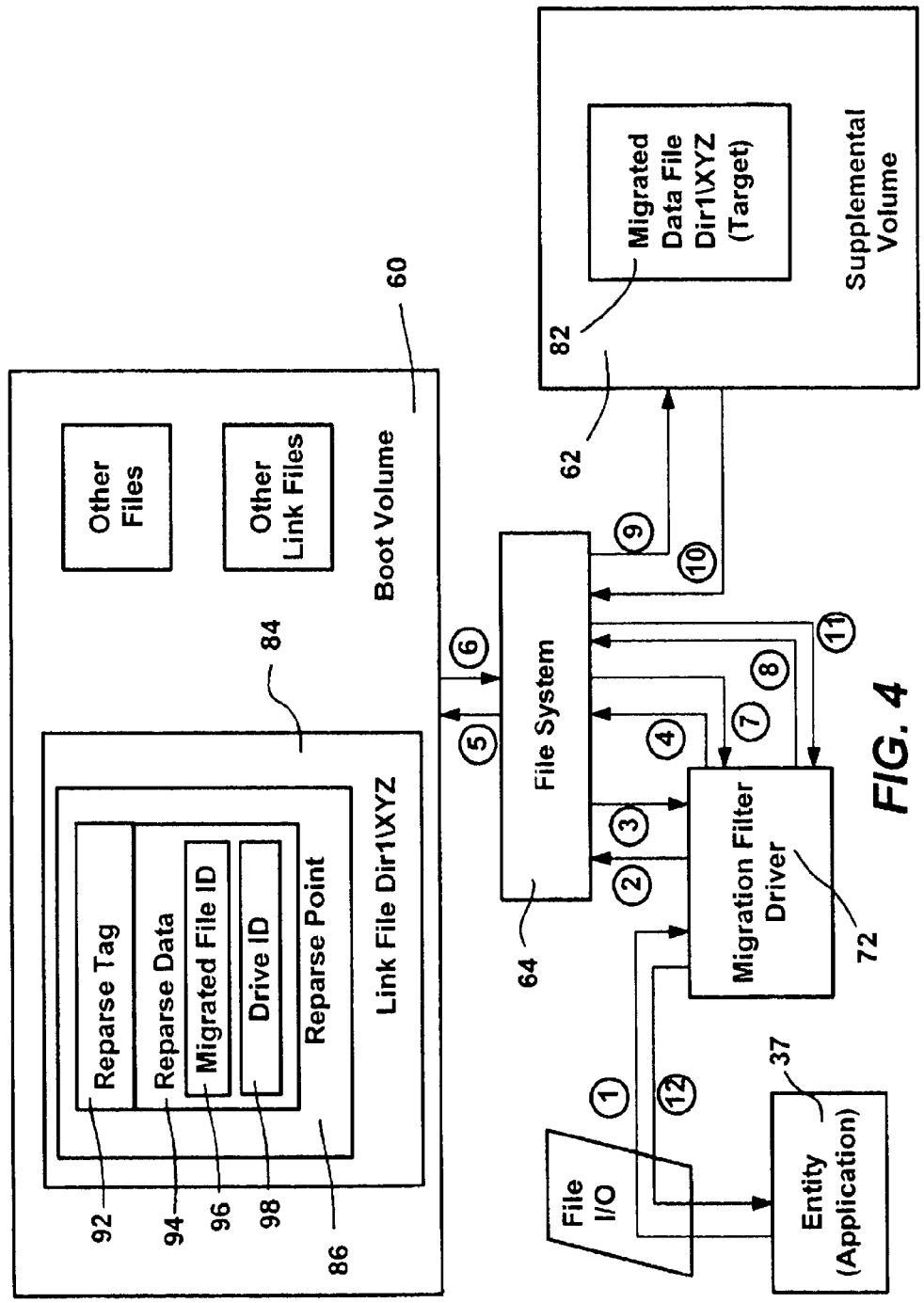
FIG. 4 is block diagram representing various components for handling the migration of files in accordance with an aspect of the present invention.

As generally represented in FIGS. 3 and 4, the link file 84 includes a relatively small amount of data in a reparse point 86, each reparse point being a generalization of a symbolic link added to a file. As generally shown in FIG. 4, the reparse point 86 includes a tag 92 and reparse data 94. The tag 92 is a thirty-two bit number identifying the type of reparse point, e.g., the associated file is known to be a link file with data on a supplemental volume. The reparse data 94 is a variable-length block of data defined by and specific to the facility that uses the reparse point. As shown in FIG. 4, one piece of information maintained in the reparse data 94 is the identity 96 (e.g., modified filename) of the file 82 containing the migrated file data. Further, for example, the reparse data 94 may include an identifier 98 of the disk drive that is storing the migrated data file 82 for the file. Other information stored in the reparse data 94 may include a signature or the like to provide security, e.g., so that a request with a falsely generated migration reparse point may not access an otherwise inaccessible file.

FIG. 4 represents the general flow of operation when a file operation (e.g., file open) is requested on a migrated file. As shown in FIG. 4, a request in the form of an IRP, (e.g., including a file name of a file that has a migration reparse point), as represented by the arrow with circled numeral one, comes in as a file I/O operation and is passed through a driver stack. The driver stack includes the migration filter driver 72, along with other optional filter drivers 70, 74 (FIG. 2) possibly above and/or below the migration filter driver 72. For purposes of the examples herein, these other filter drivers 96, 98 (shown in FIG. 2 for completeness) do not modify the migrated-file-related IRPs. When first received, the migration filter driver 72 passes the IRP on without taking any action with respect thereto, as it is generally not possible to determine if a given filename corresponds to a file with a reparse point until the file system 64 (e.g., NTFS) first processes the request.

When the IRP reaches the file system 64 (arrow with circled numeral two), the file system 64 recognizes that the file identified in the IRP has a reparse point associated therewith. Without further instruction, the file system 64 will not open files with reparse points. Instead, the file system 64 returns the IRP with a STATUS_REPARSE completion error and with the contents of the reparse point attached, by sending the IRP back up the driver stack, as represented in FIG. 4 by the arrow with circled numeral three. The migration filter driver 72 receives the STATUS_REPARSE error and recognizes the IRP as having a migration reparse point.

When received, the migration filter driver 72 sets a FILE_OPEN_REPARSE POINT flag in the original link file open IRP, and returns the IRP to the file system 64, as shown in FIG. 4 via the arrow with circled numeral four. This flag essentially instructs the file system 64 to open the link file 84 (circled numeral five) despite the reparse point, which the file system 64 attempts and receives status information (circled numeral six).

As shown in FIG. 4 by the arrow with circled numeral seven, (assuming the open was successful), the file system 64 returns success to the migration filter driver 72 along with a file object having a handle thereto. The migration filter driver 72 also requests that the file system 64 open the migrated data file 82, shown in FIG. 4 by the circled numeral eight. In response, the file system attempts the open operation (circled numeral nine), receives the status (circled numeral ten) and (assuming success) returns success to the migration filter driver 72 along with a file object having a handle thereto (circled numeral eleven).

When the success is received, the handle to the link file is returned to the requesting entity, (e.g., application program 37), shown in FIG. 4 by the arrow with circled numeral twelve. Note that the entity thus works with the link file 70, and generally has no idea that the link file 84 links the file to the migrated file data 82. At this time, assuming the opens were successful, the user has a handle to the link file 84 and the migrated file 82 is open.

Via the handle, (and depending on access rights), the entity can perform read, write, close, delete and other operations to the file. For purposes of simplicity, the use of a file handle to perform operations directed to the linked file but actually resulting in changes to the migrated data file is not described hereinafter, except to generally point out that it can be accomplished in a number of ways. By way of example, in Windows® 2000, file system requests to create/open a file pass through a filter driver that can match the file name, and change it to a different file name to correspond to the migrated file. Operations using the file handle will then actually be for the migrated file. Alternatively, for create/open requests, a second file can be created/opened by a filter driver, and the filter driver can watch for the retuned file handle and transfer any operations that use the one file handle to the other file handle. Lastly, a status reparse technique can be used as generally described above, (and in U.S. patent application Ser. No. 09/354,624, assigned to the assignee of the present application and herein incorporated by reference), i.e., by placing a reparse point on an IRP. In general, when an IRP includes a reparse point, the file system passes the IRP back up the driver stack to a filter driver that knows how to deal with the IRP and its reparse point, including resending a modified IRP back to the file system directed to the migrated file.

Figure 5:
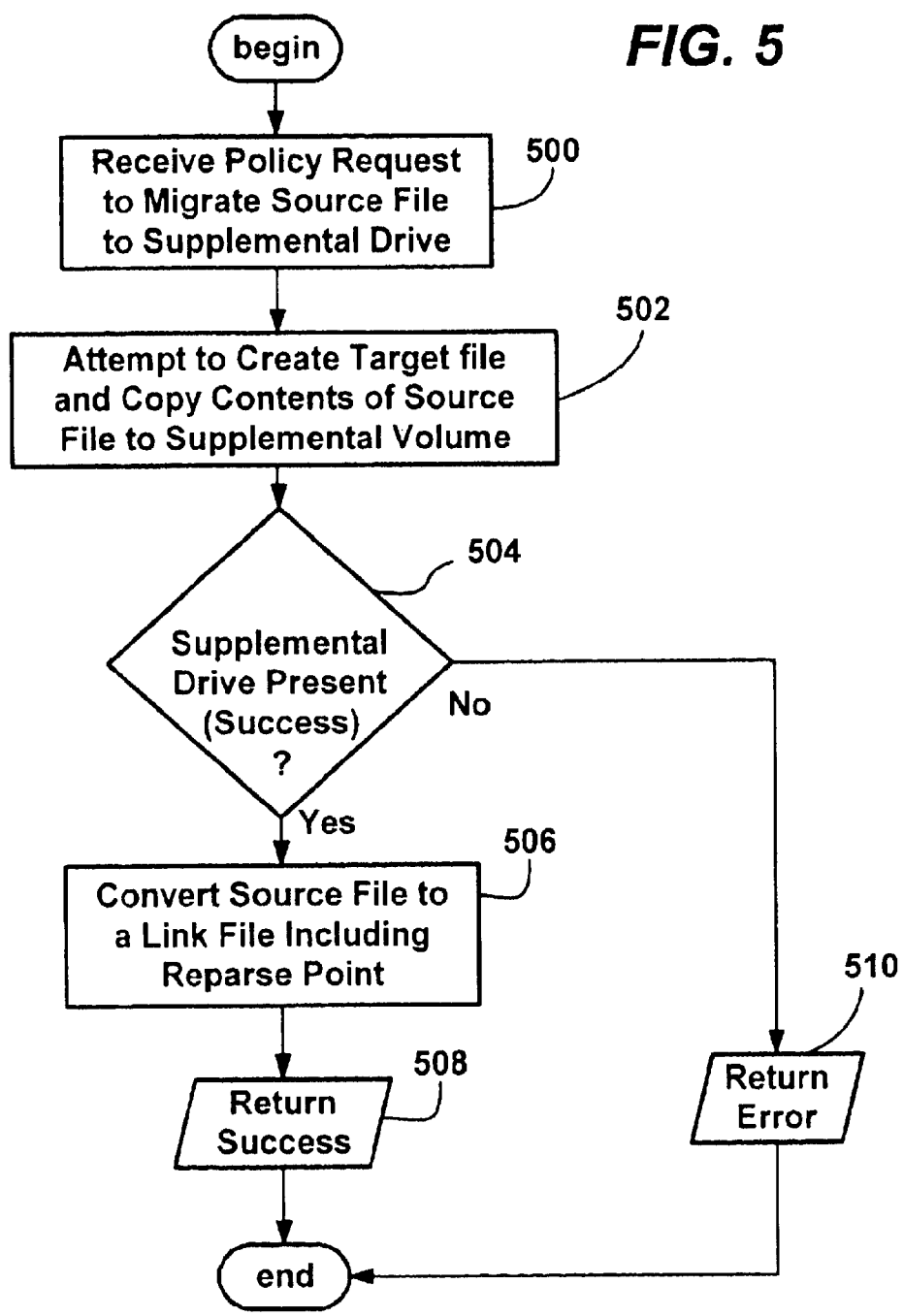
FIG. 5 is a flow diagram generally representing the steps taken when migrating an existing file to a link and migrated file in accordance with an aspect of the present invention.

Turning to FIG. 5, there is provided a general explanation of how an existing file is migrated to a supplemental disk drive, beginning at step 500 wherein a request to migrate a source file (e.g., the source file 80 of FIG. 3) to the supplemental drive (e.g., 62) is received (e.g., from the policy component 70). Note that this may be at the time of creation, or some time later. Step 502 represents the attempt to create the target file 82 on the supplemental volume 62 and copy the data from the source file 80 thereto. Note that a volume-unique name (or globally unique name, i.e., GUID) may be generated and assigned to the created migrated (target) file, which, if creation is successful will be placed in the reparse point 86. If not successful (e.g., the supplemental volume is not present) as determined at step 504, a failure is returned (step 510).

If the creation/data copy was successful, step 504 continues to step 506 where the source file 80 is converted to the sparse link file 84 and a migration reparse point 86 filled in and attached thereto, as generally described above, and success returned (step 508). In this manner, files may be migrated (e.g., by a utility or background process) to a supplemental drive. Note that because the link file remains on the boot volume, the user is provided with a unified namespace. Moreover, because the links are maintained in the original drive, the namespace remains unchanged even if the other drive is removed. For example, a user will see the full volume directory even if the new drive is removed. In one implementation, the user will be instructed to reconnect the new drive in order to access data from a removed drive.

Figure 6:
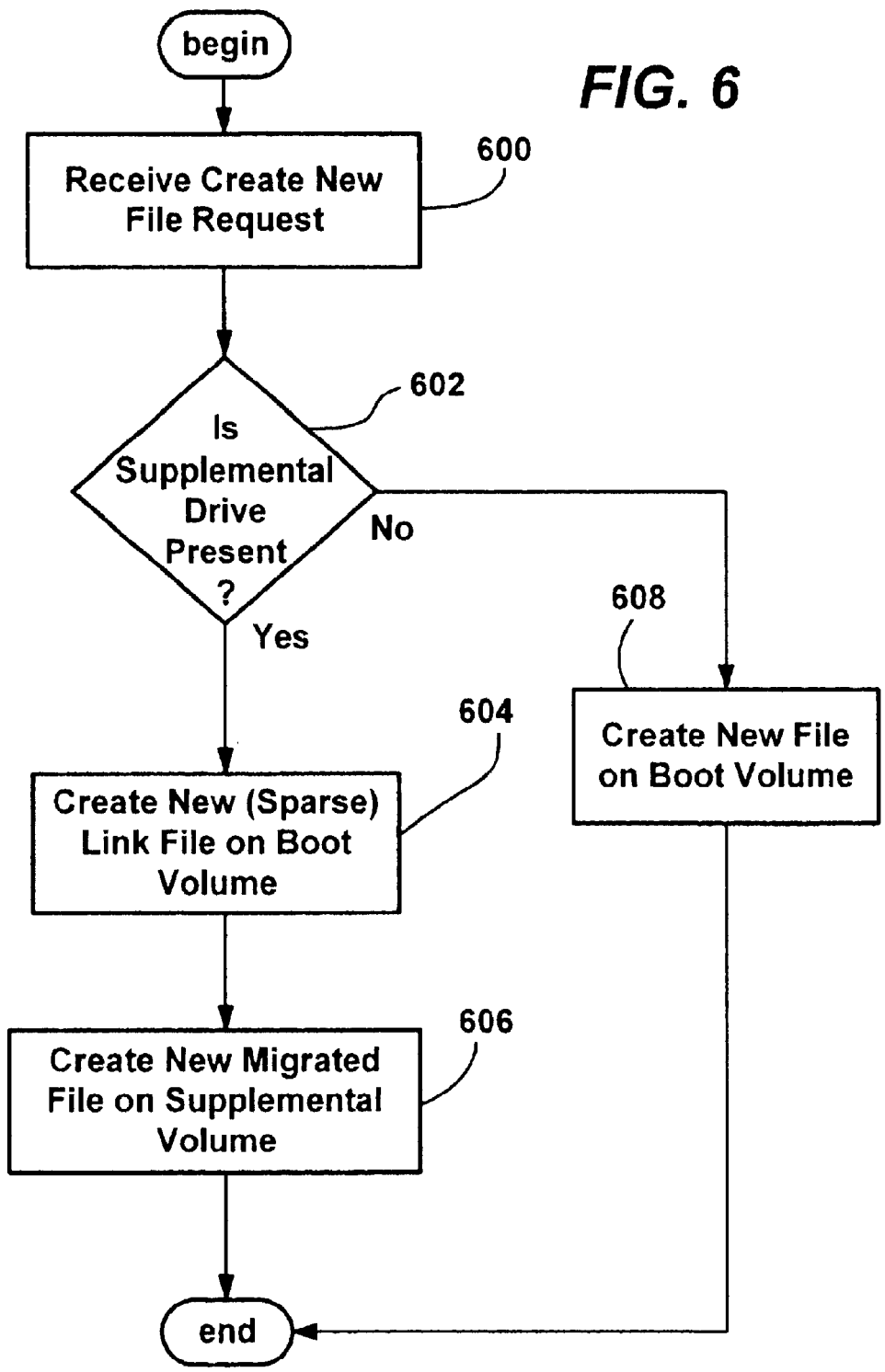
FIG. 6 is a flow diagram generally representing the steps taken when a new file is created and stored on the boot drive and supplemental drive in accordance with an aspect of the present invention.

FIG. 6 represents how a new file is created that is to have its data stored on the supplemental drive 62 (e.g., according to some policy), if possible. When the new file request is received, (step 600), an access attempt or the like is made to determine whether the supplemental drive is connected (step 602). If the supplemental drive 62 is not accessible, step 602 branches to step 608 wherein the file is created as a normal file on the boot volume drive (assuming creation is possible).

Alternatively, if the supplemental drive 62 is accessible, step 602 branches to step 604 wherein the file is created, as a link file on the boot volume drive, and (assuming success), the process continues to step 606 wherein a new migrated file is created on the supplemental volume 62. Note that a volume-unique name or GUID may be assigned to the migrated file, as described above.

Once a file is migrated, a set of rules is needed to ensure that the boot and supplemental volumes remain consistent, particularly when the supplemental volume is removable. One such set of rules may be implemented in the migration filter driver 72, and is described in the table below (and also in FIG. 7):

| Requested Operation | Supplemental Volume Connected, Target Present | Supplemental Volume Not Connected | Supplemental Volume Connected, Target Absent |
|---|---|---|---|
| Delete File (or Directory) | Delete Target, then Source | Provide Option to remove source | Delete the Source |
| Rename File (or Directory) | Rename Target, then Source | Do not allow (inconsistent) | Do not allow (inconsistent) |
| Get Freespace | Sum space of Boot and its Supplemental Volume(s) | Return Boot Freespace | Sum space of Boot and its Supplemental Volume(s) |

Figure 7:
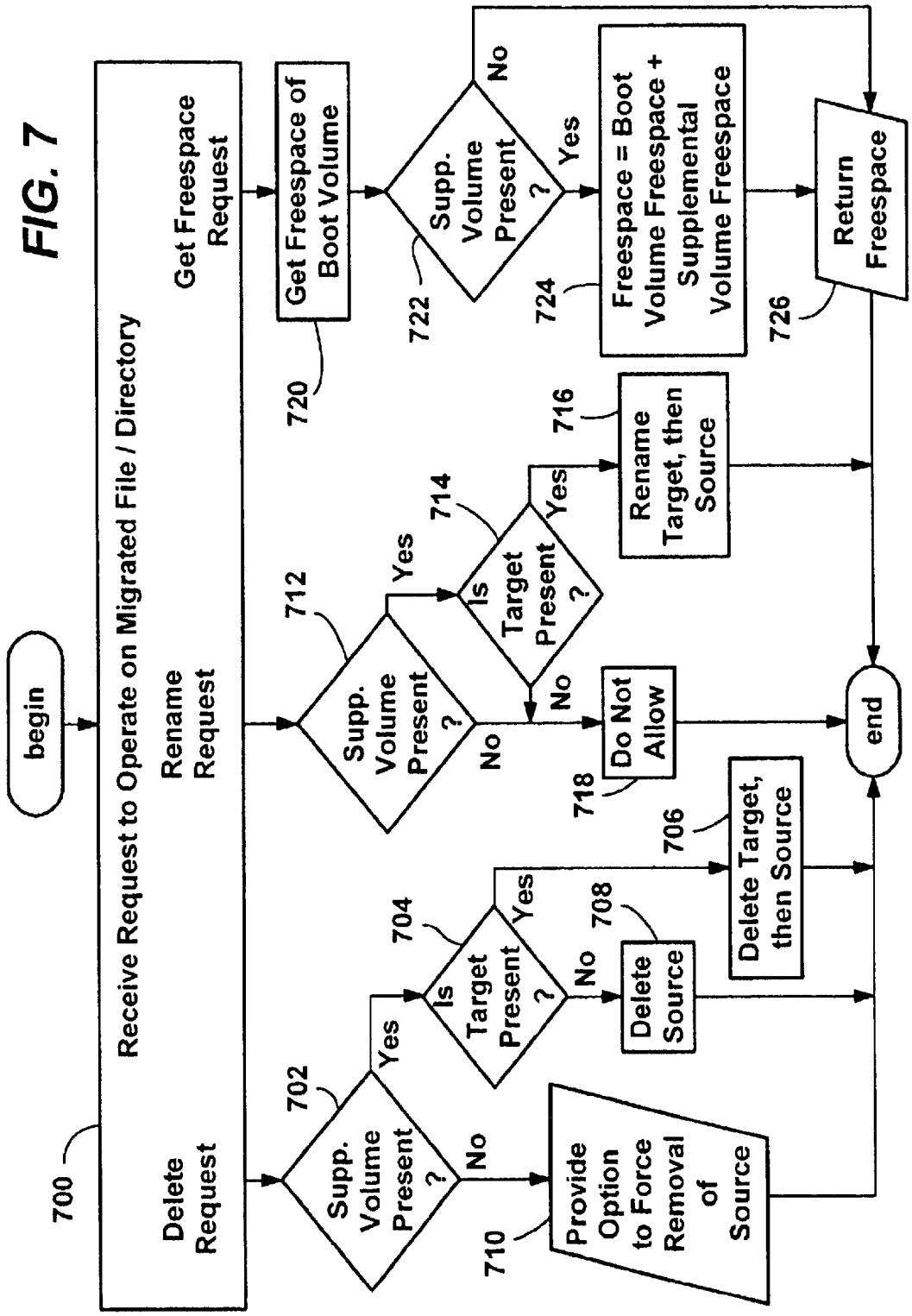
FIG. 7 is a flow diagram generally representing rules corresponding to file operations requested for migrated files depending on states of the supplemental file system and/or supplemental drive in accordance with an aspect of the present invention.

FIG. 7 sums up the usage of the table, e.g., by the migration filter driver 72, beginning at step 700 wherein one of these operation requests are received. For a delete file (or directory) request, if the supplemental volume is present (step 702) and the target is present (step 704), then the target file and source file are deleted (step 706). If the supplemental volume is present (step 702) and the target is absent (step 704), then the source file is deleted (step 708). If the supplemental volume is not present (step 702), then at step 716 the user may be prompted (or some policy may decide) whether to delete the source file. If the source file is deleted, the target file may be cleaned up (deleted) when later reconnected, e.g., by a utility program or the like. Note that the deletion of the source file may be logged so as to locate the target file when the supplemental volume is later reconnected.

For a rename request, if the supplemental volume is present (step 712) and the target is present (step 714), then the target file and source file are renamed (step 716). If the supplemental volume is present (step 712) and the target is absent (step 714), then this is not allowed by step 718. This is because an inconsistency could result, e.g., if the user creates a new file with the old name and then the supplemental volume is reconnected. Similarly, if the target file is absent at step 714, the rename operation is not allowed (step 718).

Lastly, one of the desired results of the present invention is that when a supplemental drive is attached, the volume simply appears to the user to have just grown. To this end, a request for freespace needs to sum the free space of all available supplemental volumes. Steps 722–726 represent this operation, which can be handled by the migration filter driver 72 working with the file system 64 to ensure that the freespace of each connected supplemental drive is summed with the free space of the boot volume.

As can be seen from the foregoing detailed description, there is provided a method and system that provide for transparently extending file system storage. The method and system work with removable and non-removable drives, allow users to quickly extend their storage capacity without dealing with separate volumes, and overcome the problems of having a single file system volume span multiple spindles.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system having a file system configured to manage files on an existing storage mechanism in a namespace, a method for increasing storage capacity, comprising:

detecting an addition of a new storage mechanism not mounted in a namespace of the file system viewable by a user;

selecting a file in the namespace of the file system from the existing storage mechanism;

moving some data of the selected file to the new storage mechanism; and providing a link on the existing storage mechanism to the file data moved to the new storage mechanism such that the file data moved to the new storage mechanism is accessible via the link.

2. The method of claim 1 wherein moving some data of the selected file to the new storage mechanism includes copying the file data to the new storage mechanism, and reclaiming storage space corresponding to the file data on the existing storage mechanism.

3. The method of claim 1 wherein selecting a file of the file system from the existing storage mechanism includes determining the identity of a file via a policy.

4. The method of claim 1 wherein providing the link on the existing storage mechanism to the file data includes attaching a reparse point to the link.

5. The method of claim 1 wherein the reparse point includes the identity of a file containing the file data.

6. The method of claim 1 wherein the file data of the original file is maintained in another file, and further comprising enforcing rules related to file system operations on the link file and the other file.

7. The method of claim 6 wherein the rules vary based on whether the other file is accessible at the time a file system operation is requested.

8. The method of claim 1 further comprising, receiving a request for freespace, and in response, summing freespace of the existing storage mechanism with freespace of the new storage mechanism.

9. In a computer system having an existing storage mechanism configured with a corresponding namespace, a system for increasing storage capacity, comprising:

a new storage mechanism configured to the same corresponding namespace, the new storage mechanism not mounted in a namespace of the file system viewable by a user;

a component for migrating data of a file from the existing storage mechanism to the new storage mechanism in the same namespace; and a link file on the existing storage mechanism, the link file associated with information for identifying the file data on the new storage mechanism.

10. The system of claim 9 further comprising a mechanism for handling file operation requests directed to the link file via the file data on the new storage mechanism.

11. The system of claim 10 wherein the mechanism includes a filter driver.

12. The system of claim 10 wherein the mechanism includes executable code of a file system.

13. The system of claim 10 wherein the mechanism handles request for freespace by summing freespace of the existing storage mechanism with freespace of the new storage mechanism.

14. The system of claim 10 wherein the information associated with the link file comprises a reparse point.

15. The system of claim 14 wherein the reparse point includes the identity of a file containing the file data.

16. In a computer system having a file system with a namespace, a method comprising:

receiving a request to create a file on a first storage mechanism in the namespace, and in response:
      creating the file on a second storage mechanism configured to the same namespace, the second storage mechanism not mounted in a namespace of the file system viewable by a user;
      providing a link on the first storage mechanism to the second storage mechanism; and
      maintaining at least some file data of the file on the second storage mechanism.

17. The method of claim 16 further comprising, detecting the existence of the second storage mechanism.

18. The method of claim 16 further comprising, returning a file handle to the link.

19. The method of claim 18 further comprising, receiving requests including the file handle to the link, and further comprising, modifying the request to include a file handle to the file on the second storage mechanism.

* * * * *